United States Patent [19]

Flockenhaus

[11] 4,224,109
[45] Sep. 23, 1980

[54] PROCESS AND APPARATUS FOR THE RECOVERY OF WASTE HEAT FROM A COKE OVEN OPERATION

[75] Inventor: Claus Flockenhaus, Essen, Fed. Rep. of Germany

[73] Assignees: Bergwerksverband GmbH; Didier Engineering GmbH, both of Essen, Fed. Rep. of Germany

[21] Appl. No.: 927,538

[22] Filed: Jul. 24, 1978

Related U.S. Application Data

[63] Continuation-in-part of Ser. No. 894,019, Apr. 5, 1978, abandoned.

[30] Foreign Application Priority Data

Apr. 7, 1977 [DE] Fed. Rep. of Germany ....... 2715536

[51] Int. Cl.$^2$ ............................................... C10B 5/20
[52] U.S. Cl. ..................................... 201/41; 202/111; 202/140
[58] Field of Search ............... 202/111, 122, 123, 130, 202/132, 140, 141, 146, 148; 201/15, 37, 41, 45; 432/180; 110/230

[56] References Cited

U.S. PATENT DOCUMENTS

| 1,117,172 | 11/1914 | Doherty | 202/148 X |
| 1,123,500 | 1/1915 | Doherty | 202/148 X |
| 1,898,267 | 2/1933 | Schaefer | 201/37 X |
| 3,297,562 | 1/1967 | Biddick et al. | 201/37 X |
| 3,375,175 | 3/1968 | Eddinger et al. | 201/37 X |

OTHER PUBLICATIONS

Griswold, "Fuels, Combustion and Furnaces", McGraw–Hill Book Co. Inc. 1946, pp. 426–430.
Wagner, Coal and Coke, McGraw–Hill Book Co. Inc., 1916, pp. 289–290.

*Primary Examiner*—Arnold Turk
*Attorney, Agent, or Firm*—Michael J. Striker

[57] ABSTRACT

The waste heat resulting from a coke oven operation is recovered in a two-stage proceeding. The waste gas is first cooled to not more than about 400° C. in a recuperator or regenerator of the oven to principally utilize the heat radiation of the gas. Then, in a second stage, the gas is subjected to further cooling in a separate heat exchanger to principally exploit the heat convection of the gas. The process permits to recover waste gas on both basic principles of waste recovery, that is the recovery by radiation and the recovery by convection.

21 Claims, 2 Drawing Figures

PROCESS AND APPARATUS FOR THE RECOVERY OF WASTE HEAT FROM A COKE OVEN OPERATION

RELATED APPLICATIONS

This application is a continuation in part of application Ser. No. 894,019 filed on Apr. 5, 1978, now abandoned.

BACKGROUND OF THE INVENTION

The invention relates to a process for the recovery of waste gas from a coke oven operation.

In a coke oven there is effected an indirect heating of the coal charge after it has been introduced into the heating chambers. The heat which is necessary for the coking operation is generated by burning heating gases in heating ducts which are formed by the walls of the coke oven chambers with rectangularly arranged heater girders. The heat is transferred by radiation and convection from the flame and reaction products to the walls of the oven chambers. By ducts it is then passed to the inside of the chambers from where it is again principally transferred by ducts, and only to a small portion by convection through the gasified products as heat carrier media, and by solid body radiation. This kind of heating operation because of the high terminal coking temperatures of about 1000° to 1200° C. results in high waste gas temperatures.

The recovery of heat contained in the waste gases is carried out either in periodically operating regenerators or in continuously operating recuperators. In these two types of apparatus a preheating of the heating air and possibly also of the fuel gases takes place. These parts of the apparatus because of the high temperatures are built from ceramic materials. The heat transfer in the ceramic heat storage material of a regenerator is effected by conduction and likewise, in case of a recuperator, by means of the separating walls between the heat exchange materials, i.e. the waste gas and the air.

With ceramic regenerators or recuperators it is largely possible in coke ovens to recover the waste gas and to reintroduce it into the fuel process. A disadvantage is that because of the necessity of using ceramic materials the investment costs are high. The regenerators or recuperators must have a substantial height of construction in order to obtain a sufficient heat recovery. The use of ceramic materials for the regenerators or recuperators because of the difficult sealing properties, does not permit substantial pressure differences on the gas-side of the apparatus. The result is that the heat exchanging gases can be caused to flow only with a low to moderate flow speed. The leaks which would occur in case of pressure differences between the heat exchanging media would otherwise constitute a source of malfunction and would considerably lower the effective degree of the combustion.

The heat transfer could be theoretically based principally on the radiation of the waste gas components—steam and carbon dioxide—on the waste gas side. With this form of heat transfer the ceramic material of the separating walls of the storage materials reduces the heat flow substantially because of the high conduction resistance of these materials. Besides, the spaces in which the radiation substantially determines the heat passage must be built for reasons of space economies in a manner that substantial width for the gas radiation is not available and the intensity of the radiation can therefore not be fully utilized.

Necessarily this leads to a shift of the heat transfer by radiation to a heat transfer by convection which latter has lower heat transfer coefficients than the gas radiation. The results are again still more massive constructions and higher costs.

The heat transfer coefficient in the low temperature area on the waste gas side could be increased by increasing the turbulence since this results in the transfer of the convection heat. However, this can be accomplished only by an increase of the flow speed. The ceramic material of the conventional coke ovens, however, precludes this kind of increase for the above reason of leakage danger.

In the conventional coke ovens which are equipped with ceramic regenerators or recuperators there occurs a comparatively high air excess because of the flow conditions. This lowers the heating efficiency. What would be desirable would be a nearly stoichiometric conversion of fuel gas and air oxygen which would result in a lower oxygen contents of the waste gases and therefore in an optimum heating efficiency. Conventional coke ovens however do not permit this kind of fuel adjustment for the reasons given above.

It is therefore an object of the invention to improve the recovery of the waste gases from a coke oven operation and to propose a suitable process and apparatus for this purpose.

SUMMARY OF THE INVENTION

This is accomplished by cooling the waste gas heat in a two-step procedure. In the first step the waste gas is cooled to not less than about 400° C. in a recuperator or regenerator of the oven in order to principally utilize the heat radiation of the gas. In a second subsequent stage the waste gas is subjected to further cooling in a separate heat exchanger so as to principally exploit the heat convection of the gas.

Preferably, the waste gas is cooled in the first stage to a temperature not below 800° C.

The invention thus is based on the principle that the waste gases are no longer cooled as much as possible in the usual recuperators or regenerators formed of ceramic material. Instead the recuperators or regenerators are used for the heat transfer only in the high temperature area in which the heat transfer occurs predominantly by radiation. In this area a relatively higher temperature exists at which the effectiveness of the radiation then reaches the low efficiency limit. At this relatively high temperature (compared with conventional devices) the heat is passed out of the recuperator or regenerator and is conducted for further cooling, for instance to about 180° to 200° C. into a heat exchanger which in turn can be built for optimum efficiency for the heat recovery by convection in the lower temperature range.

The process of the invention therefore has the advantage against the prior art processes with regenerators or recuperators and their single stage complete cooling of the waste gases that both basic principles of heat recovery—that of the heat recovery by radiation, and of the heat recovery by convection—are utilized to their optimum degree. Since, in the regenerators and recuperators, the cooling of the waste gas is effected only to a relatively high temperature, that is, to a temperature not below 400° C., the recuperators and regenerators can be constructed with a considerably lower height than in conventional coke ovens which results in a reduction of the investment cost up to 20%.

The coke ovens used for the invention accordingly are equipped with a heat recovery part which has a maximum height of about one-third to one-sixth of the height of the oven chamber as contrasted with the conventional case where the heights of these different parts are the same.

The further cooling, as will be explained below, is effected in apparatus parts which must anyway be present in a coke oven and which predominantly operate by utilization of convection. Therefore, additional investment cost for any parts substituted for the regenerators or recuperators are not necessary.

The reference in this discussion to the predominant utilization of the heat radiation or predominant utilization of convection within the framework of the present invention is to be understood to refer to a process and apparatus where in the first stage the heat transfer compared with conventional regenerators or recuperators is effected at a higher degree by heat radiation and where in the second stage compared to conventional regenerators or recuperators, the heat transfer is effected to a greater extent by convection.

The reference furthermore to the practically complete cooling of the waste gas is meant to refer to a cooling of the waste gases as it was accomplished heretofore in conventional regenerators and recuperators.

DETAILS AND PREFERRED EMBODIMENTS

Figure 1:
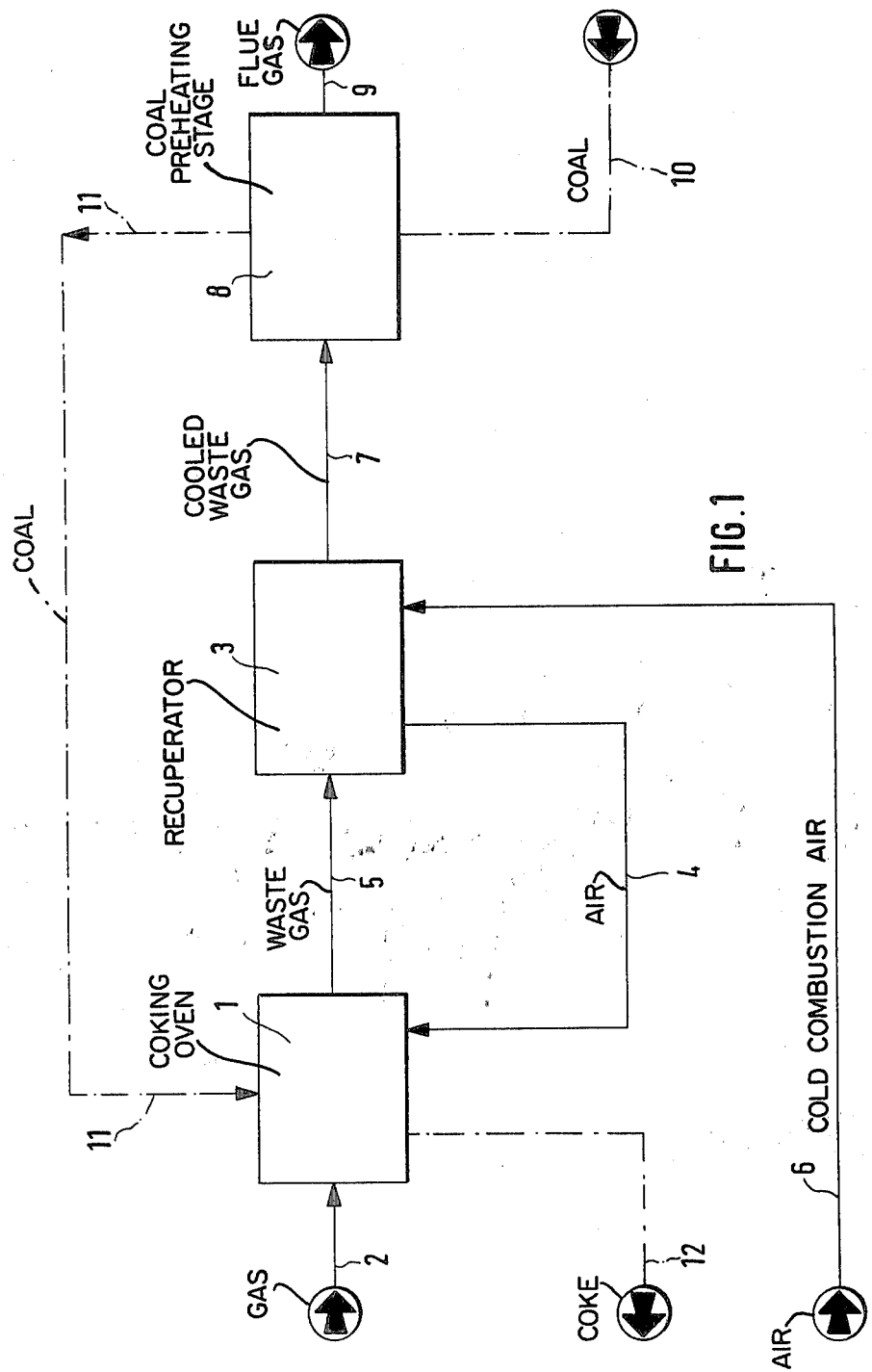
FIG. 1 is a flow sheet illustrating the process of the invention.

At the first stage of the process preferably a recuperator is used which on the side of the waste gas operates in a temperature range between about 1450° C. and 400° C. and preferably between 1300° C. and 800° C., while on the side of the air it operates in a range between the temperature of the environment and 900° C. and preferably between about the temperature of the environment and 700° C. In this temperature range the optimum heat recovery on the waste gas side is obtained by utilizing the heat radiation.

To further improve the utilization of the heat radiation it is preferred to use in the first stage a recuperator with waste gas channels of relatively large cross section. This enlargement of the width of the waste gas stream results in an increase of the intensity of the heat radiation. The term "relatively large cross section" in this connection means that the cross section of the waste gas channels of the invention after giving due consideration to all conditions and circumstances of the entire installation is larger than the cross section of the prior art recuperators. The latter usually have a cross section of about 0.025 $m^2$ while according to the invention the cross section of the waste gas channels of the recuperators should be between about 0.05 $m^2$ and 0.15 $m^2$, preferably about around 0.1 $m^2$.

In order to increase the convective heat transfer coefficient on the air-side, the recuperator in the first stage of the process may be provided with air channels of a relatively small cross section so as to increase the air flow speed. The term "relatively small cross section" in this connection has the same meaning as the just discussed term "relatively large cross section", that is the cross section of the air channels according to the invention should be around about 0.01 $m^2$ and below, while heretofore the cross section of these air channels was about 0.025 $m^2$.

The heat recovery in the first stage can be further improved as against the conventional regenerators or recuperators by using in the first stage a recuperator which has relatively thin but dense separating walls between the heat exchanging media, that is the waste gas, and the air, and which walls are formed of a material having a high heat conductivity, preferably metal. The thin separating walls between the heat exchange media of a metal with high heat conductivity will assure an excellent and fast heat conduction from the waste gas to the air. The provision of dense separating walls makes it possible that even in case of high pressure differences between the heat exchange media a nearly stoichiometric combustion is possible.

If in this connection the terms "relatively thin" and "material of high heat conductivity" are used, these terms should again be understood relative to the situation in the prior art regenerators or recuperators. The separating walls accordingly should be "thin" as compared with the usual ceramic separator walls in the prior art recuperators and the material used in the invention for the separating walls should have a higher heat conductivity than the usually employed ceramic material. Particularly steel is suited for this purpose since from this material, for instance tube-like thin and at the same time dense separating walls, can be made and this is a metal which within the framework of this invention has a high heat conductivity. A metallic recuperator which is thus equipped and subject to continuous operation permits reducing heat conductivity resistance as part of the heat transfer 10 to 30 times because of its higher heat transfer coefficient as against ceramic materials. It also permits reducing the wall thickness by 5 to 15 times, e.g. to 2–6 mm.

The metallic recuperator of the invention in addition permits using high pressure differences between the heat exchange media which in turn permits an increase of the flow speed on the side of the combustion air. These two features together result in a reduction of the heat exchange surfaces as against prior art heat recovery parts, no matter whether they are equipped with ceramic recuperators or regenerators.

For the second stage it is preferred to use a heat exchanger with relatively thin and dense separator walls between the heat exchange media if the heat absorbing medium is likewise a gaseous medium and which are formed of a material having a relatively high heat conductivity, preferably metal. If the heat absorbing medium is other than gaseous the heat exchanger may be built without any separating walls between the heat exchange media.

The terms "relatively thin" and "relatively high heat conductivity" are again to be understood in the same sense as before, that is as in comparison to conventional regenerators or recuperators made of ceramic material. While the heating of the oven chamber lining so far occurred solely through heat conduction and to a small portion only through convection, the second stage of the heat recovery in the invention permits an optimum of convective heat transfer to the heat absorbing medium which may for instance be the material fed into the oven. The part of the total heat which after cooling to about 400° to 800° C. is not used in the recovery portion of the coke oven to preheat the air can easily be replaced by a stronger heating of the heat ducts.

In order to improve the convective heat transfer it is preferred to use as second stage a heat exchanger which, on the side of the waste gas, operates with a comparatively high flow speed. "Comparatively high" in this connection means again that the flow speed of the waste gas is higher in the invention as against the conventional regenerators or recuperators and may be about 20 to 60 m/sec.

It is for instance possible to use as the second stage a heat exchanger in which the heat adsorbing medium, that is the directly heated feed material, has a relatively high heat conductivity. Such material, preferably, is coal. As is well known, coal has a higher heat conductivity coefficient than ceramic materials and is therefore preferred as the feed material for the second stage.

This approach, the use of coal as feed material also permits having a coke oven with a substantially lower recuperator from which the waste gas is received at a relatively high temperature and to combine such recuperator with a preheating installation which may anyway be used or be necessary for the coal. This is accomplished by operating the coal preheating installation with the waste gas which is only partially cooled in the recuperator and is then passed to the preheating installation for further heat recovery.

This should make it apparent that the total structure which otherwise is necessary for the further cooling of the waste gas from about 800° C. to about 200° C. can be dispensed with and a substantial reduction of investment cost may thus be obtained. Besides, the effectiveness of the heat recovery in the remaining short section of the recuperator of the invention, as well as in the connected preheating installation, is obviously higher than in prior art recuperators of full length in which the waste gases for practical purposes are completely cooled. Thus, in addition to the saving in investment cost, there is also an improved degree of efficiency.

As the second stage there may be used a flow current installation, a fluidizing bed or a bubble bed which is operated with finely divided coal as heat absorbing medium. These installations have proved useful for the optimum utilization of the convective heat transfer since therewith the maximum relative heat speed may be obtained between heat absorbing medium and heat discharging medium.

As the second stage of the invention there may for instance also be used a low temperature coking installation or a coal gasifier since the "waste heat" of a coke oven will always be cheaper than heat generated as primary energy.

If this is convenient or necessary it is also possible to mix the waste gas which has been subjected to a partial cooling in the first stage prior to its transfer into the second stage with preferably inert gases such as nitrogen, carbon dioxide or steam, or a mixture of these gases and to cool it thereby or also to add heat to it by combustion of fuel gases.

An optimum heat recovery for the coking operation is obtained in the preferred form of the present invention where a metallic radiation recuperator is used for the only partial heat recovery of the sensible waste gas heat together with a coal preheating installation such as a flow current installation, a fluidizing bed or a bubble bed.

The preheating installation from the point of view of economy consititutes the second part of the heat recovery without change of the heat balance. The total gas to be used for heating remains constant. Thus, a saving in regenerator and recuperator cost in the range below 400° and preferably in the range below 800° can support the investment cost for the flow current, fluidizing or bubble bed installation for the feed material. If it is assumed that the investment costs of such cold preheating installation are equivalent to the saving it follows that each percentage of production increase through preheating which, as is well known, may be up to 60% can be considered an investment cost saving from 0 to 30% for the coke producing part of a coking operation. This constitutes a great technical advance also for the reason that the use of the preheated coal not only effects a production increase but in particular also is important for the broadening of the coal type which may be used for the coking operation.

Figure 2:
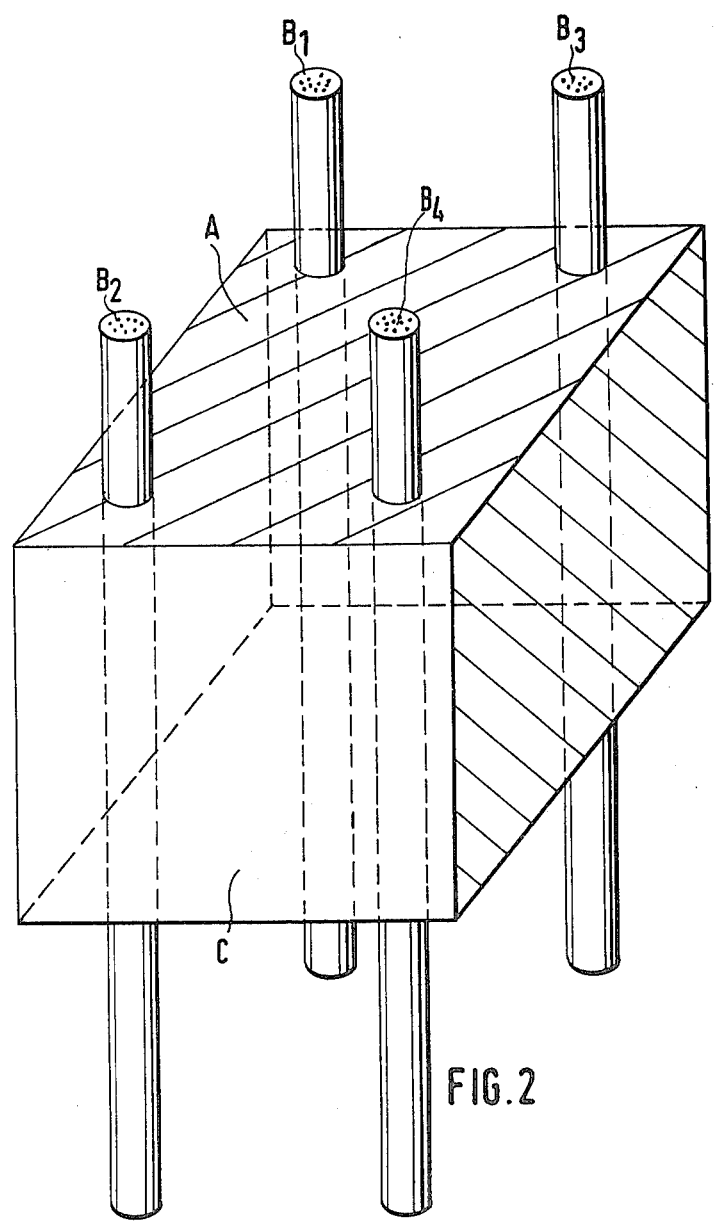
FIG. 2 is a simplified illustration, in perspective, of a recuperator used in the process of the invention.

The structural embodiments of the invention are shown in FIGS. 1 and 2.

FIG. 1 shows diagrammatically the use of the invention in a recuperative coking oven which is combined with a coal-preheating stage. The coking oven 1 has heating flues in which gas 2 is combusted with air 4 which has been preheated in the metallic recuperator from 20° C. to 900° C. The waste gases 5 enter the recuperator 3 at a temperature between 1450° C. and 1400° C., depending upon the coking conditions. Cold combustion air 6 is heated by the waste gases 5 and is heated up from its temperature of 20° C. to a temperature of 900° C.; due to this heat exchange the waste gases 5 loose heat and cool down to about 600° C.–400° C. The thus cooled waste gases 7 then enter at this temperature into the coal preheating stage 8 wherein they undergo further cooling, down to a temperature of about 250° C., and are then vented as flue gases 9 into the atmosphere.

Cooling of the gases in the coal preheating stage 8 results from their exchange of heat with the coal 10 therein, which causes the coal 10 to become preheated to a temperature of about 150° C. to 250° C. The preheated coal, now designated with reference numeral 11, is then filled into the chambers of coke oven 1 wherein it undergoes conversion into coke 12 which is then expelled from the chambers.

FIG. 2 shows one embodiment of a suitable recuperator. It will be seen that the waste gas from the flues of a coke oven enters into the recuperator over the surface area A which consititues the cross-section of the radiation chamber C; this cross-section should be between about 0.05 m² and 0.15 m².

The air to be preheated for each heating flue of the coke oven enters the recuperator through the cross-sectional area B. This area B may be composed of a plurality of cross-section $B_1$–$B_4$; however, the sum of the cross-sections for each individual heating flue should not exceed about 0.1 m².

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A process for the recovery of waste heat from a coke oven operation, comprising:

cooling waste gas in a first stage to not less than about 400° C. in a recuperator of the oven having waste gas channels of a cross-section of about 0.05 to 0.15 m² and air channels of a cross-section of at most about 0.01 m² so as to principally achieve heat transfer due to radiation of the waste gas; and subjecting the waste gas in a second stage to further cooling in a separate heat exchanger wherein heat transfer is principally by convection.

2. The process of claim 1 wherein the cooling in said first stage is carried down to at most about 800° C.

3. The process of claim 1 wherein said waste gas channels have a cross section of about 0.1 m².

4. The process of claim 1 wherein the heat exchanger employed in said second stage is built without separating walls between the heat exchange media, the heat absorbing medium being other than a gaseous medium.

5. The process of claim 1 wherein the heat exhanger employed in said second stage operates at a high flow speed of the waste gas of about 20 to 60 m/sec.

6. The process of claim 1 wherein partially cooled waste gas from the first stage is subjected to a renewed heat recovery by adding thereto waste gas from a coal preheating installation or by addition of fresh fuel gases thereto.

7. The process of claim 1 wherein a recuperator is employed in said first stage which has about one third to one sixth the height of the chamber of said coke oven.

8. The process of claim 1, wherein in the said first stage a recuperator having a waste gas side and an air side is used which operates at the waste gas side in the temperature range between about 1450° and 400° C. and at the air side in the temperature range between ambient temperature and 900° C.

9. The process of claim 1, wherein waste gas partially cooled in said first stage is mixed with inert gases prior to said second stage.

10. The process of claim 1 wherein the heat exchanger employed in said second stage has thin partition walls between the heat exchange media, the heat absorbing medium being gaseous and wherein the separating walls are formed of a material of high density and high conductivity.

11. The process of claim 10 wherein the separating walls are made of metal.

12. The process of claim 1 wherein a recuperator is employed in said first stage which is provided with thin separator walls between the waste gas and air which walls consist of a material of high density and high heat conductivity.

13. The process of claim 12 wherein said separating walls have a thickness of about 2–6 mm.

14. The process of claim 12 wherein said separating walls consist of metal.

15. The process of claim 14 wherein said separating walls consist of steel.

16. The process of claim 1 wherein a heat absorption material of high heat conductivity is directly fed into said heat exchanger of the second stage.

17. The process of claim 16 wherein said heat absorption material is coal.

18. The process of claim 17 wherein said coal is passed through a flow current installation, fluidizing bed or bubble bed as said heat exchanger.

19. The process of claim 17, wherein the heat exchanger is in the form of a low temperature coking installation.

20. The process of claim 17, wherein the heat exchanger is in the form of a coal gasifier.

21. A coking oven system comprising an oven chamber, a first stage heat recovery portion in the form of a recuperator having about one third to one sixth the height of the oven chamber and waste gas channels of a cross section of about 0.05 to 0.15 m² diameter and air channels of a cross section of at most about 0.01 m², with walls separating the waste gas and air made of metal of a thickness of about 2 to 6 mm.

* * * * *